(12) United States Patent
Ninomiya et al.

(10) Patent No.: US 10,184,362 B2
(45) Date of Patent: Jan. 22, 2019

(54) INTAKE DEVICE OF INTERNAL COMBUSTION ENGINE

(71) Applicant: AISIN SEIKI KABUSHIKI KAISHA, Kariya-shi, Aichi-ken (JP)

(72) Inventors: Kyohei Ninomiya, Kariya (JP); Toshiyuki Oiwa, Handa (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/464,945

(22) Filed: Mar. 21, 2017

(65) Prior Publication Data

US 2017/0276033 A1 Sep. 28, 2017

(30) Foreign Application Priority Data

Mar. 24, 2016 (JP) ................... 2016-060933

(51) Int. Cl.
*F01L 7/16* (2006.01)
*F02M 35/10* (2006.01)
*F01L 7/02* (2006.01)

(52) U.S. Cl.
CPC ............... *F01L 7/16* (2013.01); *F01L 7/027* (2013.01); *F02M 35/10072* (2013.01)

(58) Field of Classification Search
CPC ........ F01L 7/16; F01L 7/027; F02M 35/10072
See application file for complete search history.

(56) References Cited

U.S. PATENT DOCUMENTS

2008/0128038 A1* 6/2008 Hutchinson ............ F02D 9/106
137/862

FOREIGN PATENT DOCUMENTS

| CN | 202832888 U | * | 3/2013 |
| JP | 2014-001719 A | | 1/2014 |

* cited by examiner

*Primary Examiner* — Jacob Amick
*Assistant Examiner* — Charles Brauch
(74) *Attorney, Agent, or Firm* — Buchanan Ingersoll & Rooney PC

(57) ABSTRACT

An intake device of an internal combustion engine, includes: a plurality of intake ports which have outer walls and partition walls and are adjacent to each other via the partition walls; a valve body which is provided in each of the intake ports, and switches a flow path of the intake port by rotation around a rotation shaft; a holding member which is installed on each of the outer walls and the partition walls; and a rolling bearing which is mounted on at least one of the holding members, and supports the valve body to be freely rotatable, wherein the holding member includes a wall surface between the rolling bearing and the valve body in a direction in which the rotation shaft extends.

10 Claims, 8 Drawing Sheets

INTAKE DEVICE OF INTERNAL COMBUSTION ENGINE

CROSS REFERENCE TO RELATED APPLICATIONS

This application is based on and claims priority under 35 U.S.C. § 119 to Japanese Patent Application 2016-060933, filed on Mar. 24, 2016, the entire contents of which are incorporated herein by reference.

TECHNICAL FIELD

This disclosure relates to an intake device of an internal combustion engine.

BACKGROUND DISCUSSION

JP 2014-1719A (Reference 1) discloses an intake device of an internal combustion engine including: an intake manifold including a plurality of intake passages; a partition wall formed between each of the intake passages; an opening and closing valve which is provided in each of the intake passages; a rotation shaft which rotates the opening and closing valve; and a bearing block which is disposed in the partition wall and supports the rotation shaft to be freely rotatable. Here, the opening and closing valve has a soft material having sealing properties in a circumferential edge portion, and is formed to communicate with a flow path by shutting off and being separated from the flow path as the circumferential edge portion abuts against the intake manifold. In addition, by forming a bearing hole in the bearing block and by mounting a ball bearing which receives the rotation shaft on the bearing hole, the reduction of noise of a bearing unit is achieved.

In the intake device of an internal combustion engine of Reference 1, since the bearing hole for mounting the ball bearing on the bearing block is open opposing the opening and closing valve, it is difficult to seal a part at which the circumferential edge portion of the opening and closing valve forms the bearing hole. Therefore, in a state where the opening and closing valve is in a closed state, there is a concern that a fluid leaks from the part at which the bearing hole is formed, and as a result, deterioration of sealing performance of a valve body is caused.

Thus, a need exists for an intake device of an internal combustion engine which is not susceptible to the drawback mentioned above.

SUMMARY

A feature of an intake device of an internal combustion engine according to an aspect of this disclosure resides in that the intake device of an internal combustion engine includes: a plurality of intake ports which have outer walls and partition walls and are adjacent to each other via the partition walls; a valve body which is provided in each of the intake ports, and switches a flow path of the intake port by rotation around a rotation shaft; a holding member which is installed on each of the outer walls and the partition walls; and a rolling bearing which is mounted on at least one of the holding members, and supports the valve body to be freely rotatable, in which the holding member includes a wall surface between the rolling bearing and the valve body in a direction in which the rotation shaft extends.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, the embodiment of the disclosure will be described based on the drawings.

A configuration of an intake device 100 according to a first embodiment of the disclosure will be described with reference to FIGS. 1 to 7.

Figure 1:
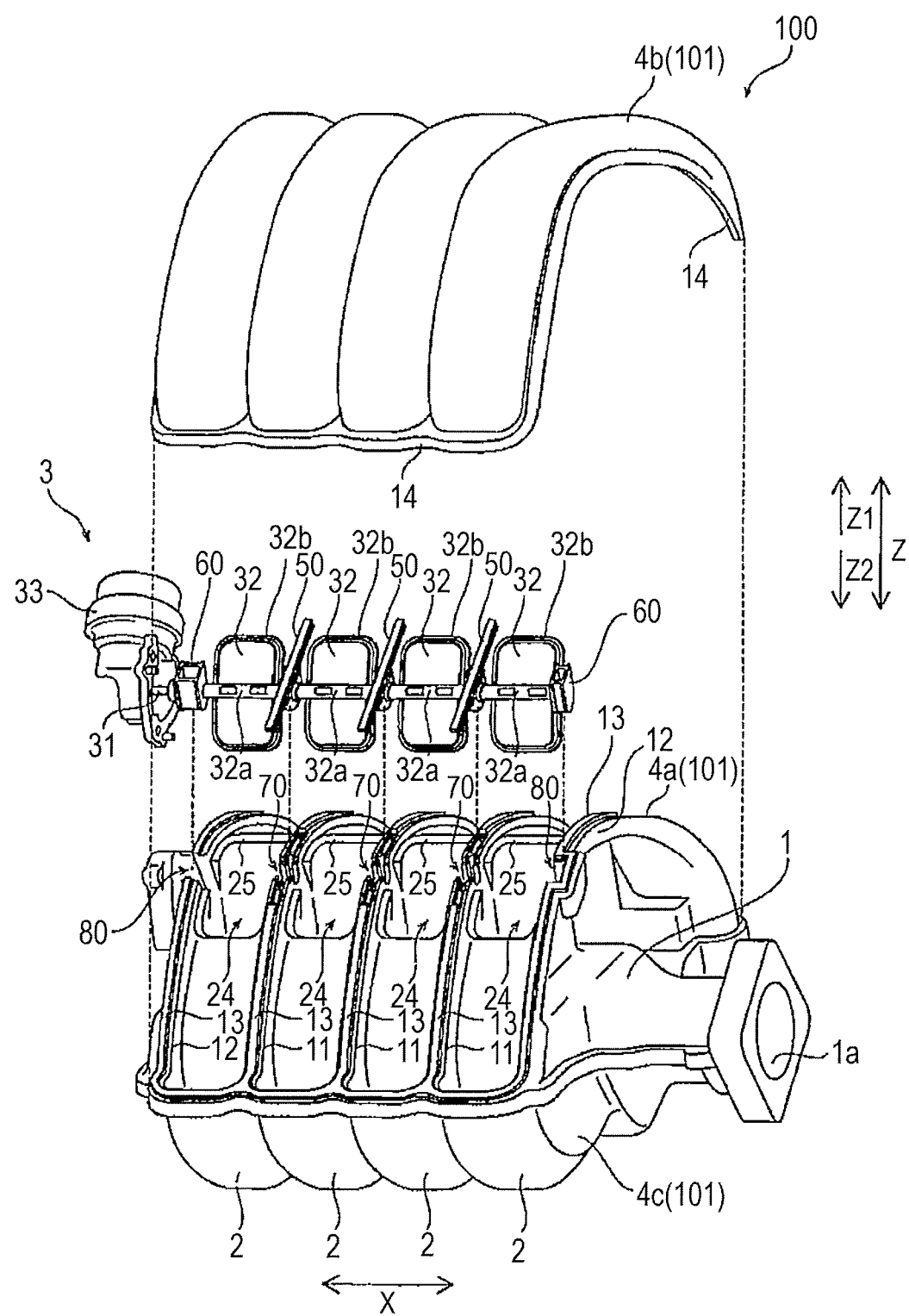
FIG. 1 is an exploded perspective view illustrating a configuration of an intake device in the disclosure.
Figure 2:
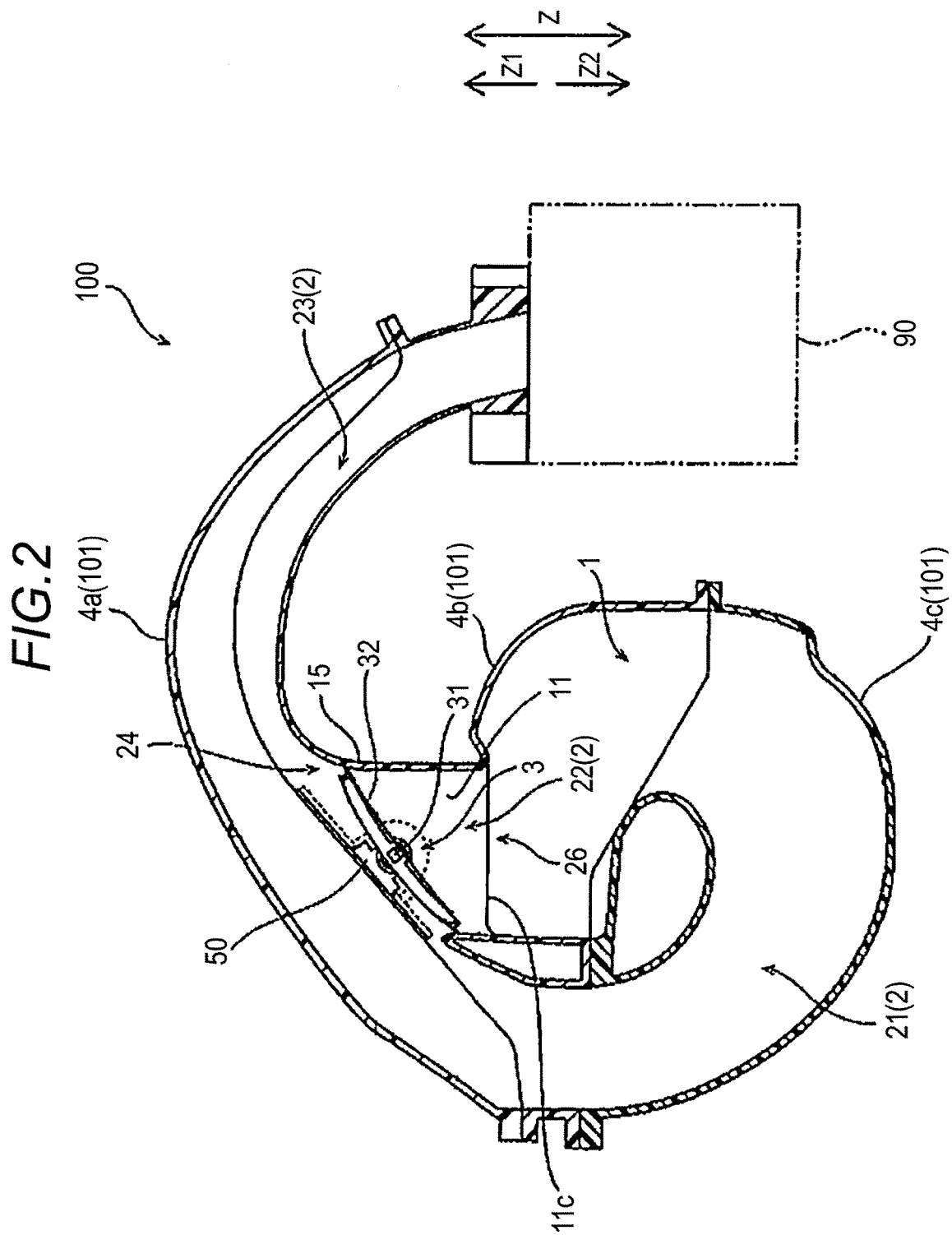
FIG. 2 is a schematic sectional view along an intake port of the intake device in FIG. 1.

As illustrated in FIG. 1 as an example, the intake device 100 is provided in an in-line four-cylinder engine (not illustrated) for a vehicle. The intake device 100 is provided with a surge tank 1; four intake ports 2 which are branched from the surge tank 1 and disposed downstream of the surge tank 1; and intake control valves 3 which are respectively provided on the inside of the four intake ports 2. In addition, in the structure, the intake device 100 includes an intake device main body 101 that integrally includes the surge tank 1 and the four intake ports 2. The intake device main body 101 is made of a resin material, for example, nylon 6 (PA6). In addition, as illustrated in FIGS. 1 and 2, the intake control valve 3 is provided on the inside of the intake device main body 101. The intake device 100 is connected to a cylinder head 90 (refer to FIG. 2), and the four intake ports 2 are respectively connected to each of cylinders of the engine via the cylinder head 90.

The intake device main body 101 includes three main body parts 4a to 4c. At the main body parts 4a to 4c, welding units are respectively formed along each of joining units of the welding units. In addition, in a state where the intake control valve 3 is mounted on the main body part 4a, the main body part 4b and the main body part 4c are integrally joined to the main body part 4a by vibration welding, respectively from an upper surface side of the main body part 4a and from a lower surface side of the main body part 4a. Furthermore, for convenience of description, as illustrated in FIG. 1, a Z1 direction on the main body part 4b side is an upward direction, and a Z2 direction on the main body part 4c side is a downward direction. In addition, the main body part 4a and the main body part 4b are respectively an example of "first intake device main body" and "second intake device main body" of the disclosure.

At the main body part 4a, line-like first welding units 13 which extend along partition walls 11 and outer walls 12 between the four intake ports 2 are formed on upper end surfaces of the partition walls 11 and the outer walls 12. In addition, at the main body part 4b on the upper side of the main body part 4a, a line-like second welding unit 14 which is welded to the first welding units 13 and is provided to extend along the partition walls 11 and the outer walls 12 between the intake ports 2 is formed on lower end surfaces of the partition walls 11 and the outer walls 12. As the main body part 4a (first welding unit 13) and the main body part 4b (second welding unit 14) are joined to each other, a part between the main body part 4a and the main body part 4b among the four intake ports 2 is formed. The main body part 4c and the main body part 4a are also joined in a similar manner, the corresponding welding units are respectively joined to each other, and the intake device main body 101 is configured. Furthermore, any of the first welding unit 13 and the second welding unit 14 is an example of "main body side welding unit" of the disclosure.

As illustrated in FIG. 1, intake air which reaches the surge tank 1 via an air cleaner and a throttle which are not illustrated flows into the surge tank 1 from an input unit 1a. Four intake ports 2 are disposed to be aligned in a horizontal direction (X direction) to be adjacent to each other via the partition wall 11. As illustrated in FIG. 2, each of the four intake ports 2 includes a first port unit 21, a second port unit 22, and an outlet port unit 23 which is connected to the cylinder of the engine on the downstream side of the first port unit 21 and the second port unit 22. The first port unit 21 is connected to the outlet port unit 23 on the downstream side extending to detour from the surge tank 1. The second port unit 22 is provided to connect the surge tank 1 and the outlet port unit 23 via the intake control valve 3.

In addition, the intake control valve 3 is configured to open and close an opening unit 24 which is positioned at a part at which the second port unit 22 and the outlet port unit 23 are connected to each other. In a state (illustrated in FIG. 2) where the intake control valve 3 is closed, a long port having a longer intake path length than those of the first port unit 21 and the outlet port unit 23 is formed, and in a state (not illustrated) where the intake control valve 3 is open, a short port having a shorter intake path length than those of the second port unit 22 and the outlet port unit 23 is formed. Accordingly, the intake control valve 3 is configured to be capable of changing the intake path length. In other words, the intake control valve 3 functions as an intake control valve for a variable intake valve which changes the intake path length to each of the cylinders of the engine by opening and closing the opening unit 24.

As illustrated in FIG. 1, the intake control valve 3 includes a rotation shaft 31 which rotates together with a valve body 32; four valve bodies 32 which open and close the second port unit 22 (opening unit 24); an actuator 33 which rotates the rotation shaft 31; an intermediate holding member 50 and an end portion holding member 60 which support the rotation shaft 31 and the valve body 32 to be rotatable. The actuator 33 is a negative actuator which generates a driving force by supplying a negative pressure. Furthermore, the valve body 32 is an example of "valve body for a variable intake valve" of the disclosure.

The rotation shaft 31 extends in the horizontal direction (direction in which the four intake ports 2 are aligned) orthogonal to the intake port 2, and is made of a metal polygonal shaft which penetrates the four second port units 22. The rotation shaft 31 holds both ends to be freely rotatable by the two end portion holding members 60 disposed in a bearing mounting unit 80 of the outer wall 12, and supports the center portion to be freely rotatable by the three intermediate holding members 50 disposed in a bearing mounting unit 70 of the partition wall 11. In addition, hereinafter, the extending axial direction of the rotation shaft 31 is the X direction.

In the embodiment, the valve body 32 is a valve body for a variable intake valve which is provided to change the length of the intake port 2 by opening and closing the opening unit 24 between the surge tank 1 and the intake port 2. Total four valve bodies 32 are provided in each of the four intake ports 2. The valve body 32 is made of a resin plate-like member, and has a substantially rectangular external shape which corresponds to the opening unit 24. In addition, in the valve body 32, the rotation shaft 31 is inserted into a shaft insertion unit 32a which intersects the center portion of the longitudinal direction in the X direction, and accordingly, the four valve bodies 32 are mounted on the rotation shaft 31 to rotate integrally with the rotation shaft 31. Both ends of the shaft insertion unit 32a protrude to the outer side in the axial direction (X direction), and are respectively inserted to be freely rotatable into the intermediate holding member 50 which is a holding member or the end portion holding member 60 which is a holding member which is disposed at both ends of the valve bodies 32. Accordingly, each of the valve bodies 32 is held to be freely rotatable by the intermediate holding member 50 and the end portion holding member 60, and the rotation shaft 31 is also supported by the intermediate holding member 50 and the end portion holding member 60 via each of the valve bodies 32.

A rubber seal lip 32b (an example of a sealing unit) is provided in a circumferential edge portion of the valve body 32. Meanwhile, in the opening unit 24 of the intake port 2, a sealing surface 25 which abuts against the valve body 32 in a closed state is formed. As the seal lip 32b of the valve body 32 and the sealing surface 25 of the intake port 2 (opening unit 24) abut against each other, airtightness of the opening unit 24 in a closed state of the valve body 32 is improved. The intake control valve 3 is configured to perform the opening and closing operations of the opening unit 24 at the same time in all of the four intake ports 2 by rotating the rotation shaft 31 and integrally rotating the four valve bodies 32.

The intermediate holding member 50 and the end portion holding member 60 are made of a resin, and are disposed in the bearing mounting unit 70 formed on the partition wall 11 between the adjacent intake ports 2 and in the bearing mounting unit 80 formed on the outer walls 12 of both ends, as illustrated in FIG. 1. In the embodiment, total three intermediate holding members 50 are respectively provided on the partition walls 11 between the adjacent intake ports 2. In addition, a ball bearing 34 which is a rolling bearing is included in the intermediate holding member 50 and the end portion holding member 60, and the rotation shaft 31 and the shaft insertion unit 32a of the valve body 32 are configured to be supported to be freely rotatable in the ball bearing 34. Here, the ball bearing 34 may be mounted only on any one of the intermediate holding member 50 and the end portion holding member 60. In the embodiment, an example in which the ball bearing 34 is mounted on an intermediate holding member 50a that corresponds to the center among one end portion holding member 60a and three intermediate holding members 50, is illustrated.

Figure 3:
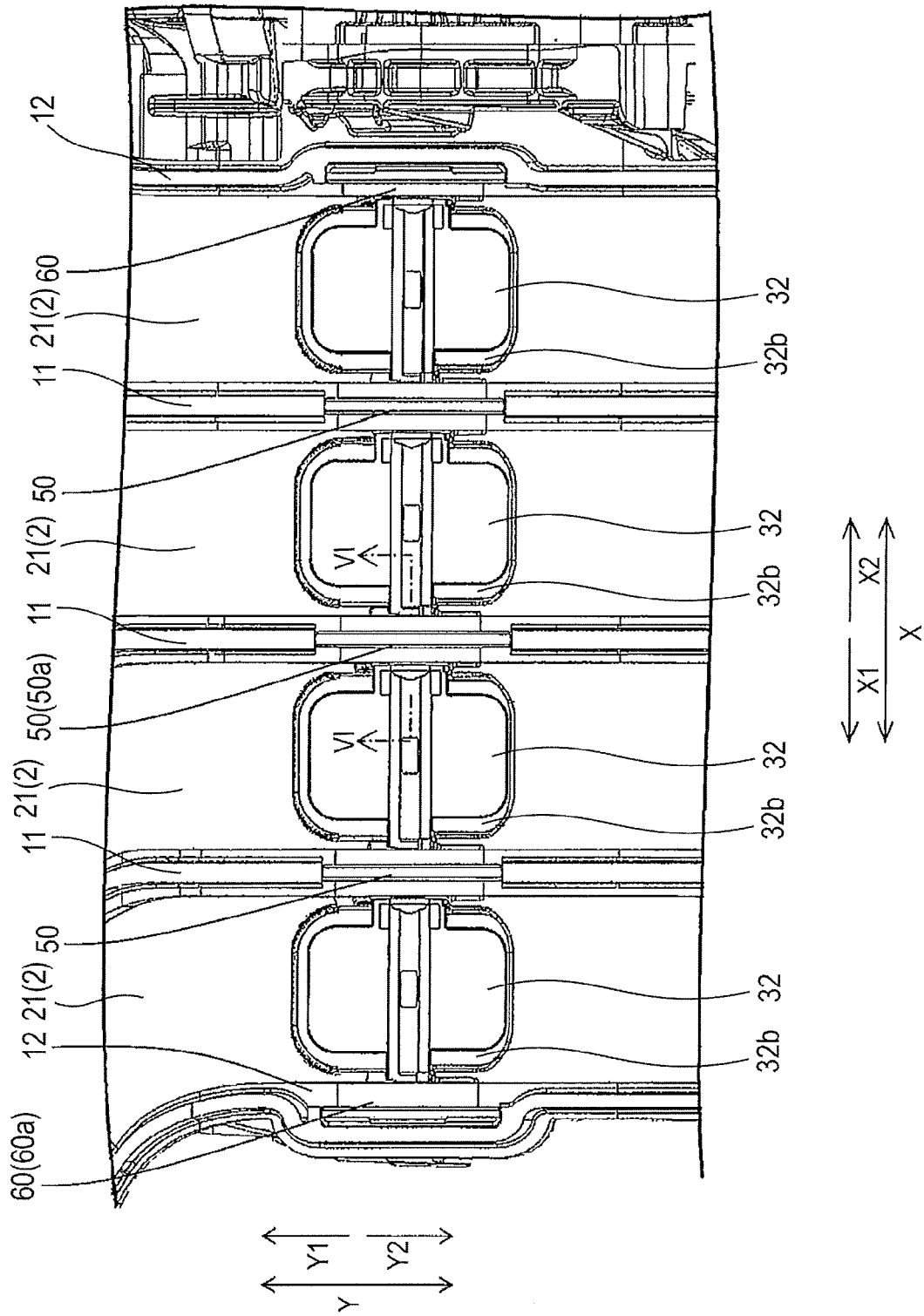
FIG. 3 is a partially enlarged view illustrating a closed state of a valve body in FIG. 1.

As illustrated in FIG. 3, the intermediate holding member 50 and the end portion holding member 60 are resin members, and made of a material (for example, nylon 6 (PA6)) which is similar to that of the intake device main body 101. Here, since the intermediate holding member 50 and the end portion holding member 60 have different configurations, the intermediate holding member 50 and the end portion holding member 60 will be respectively described.

Figure 5:
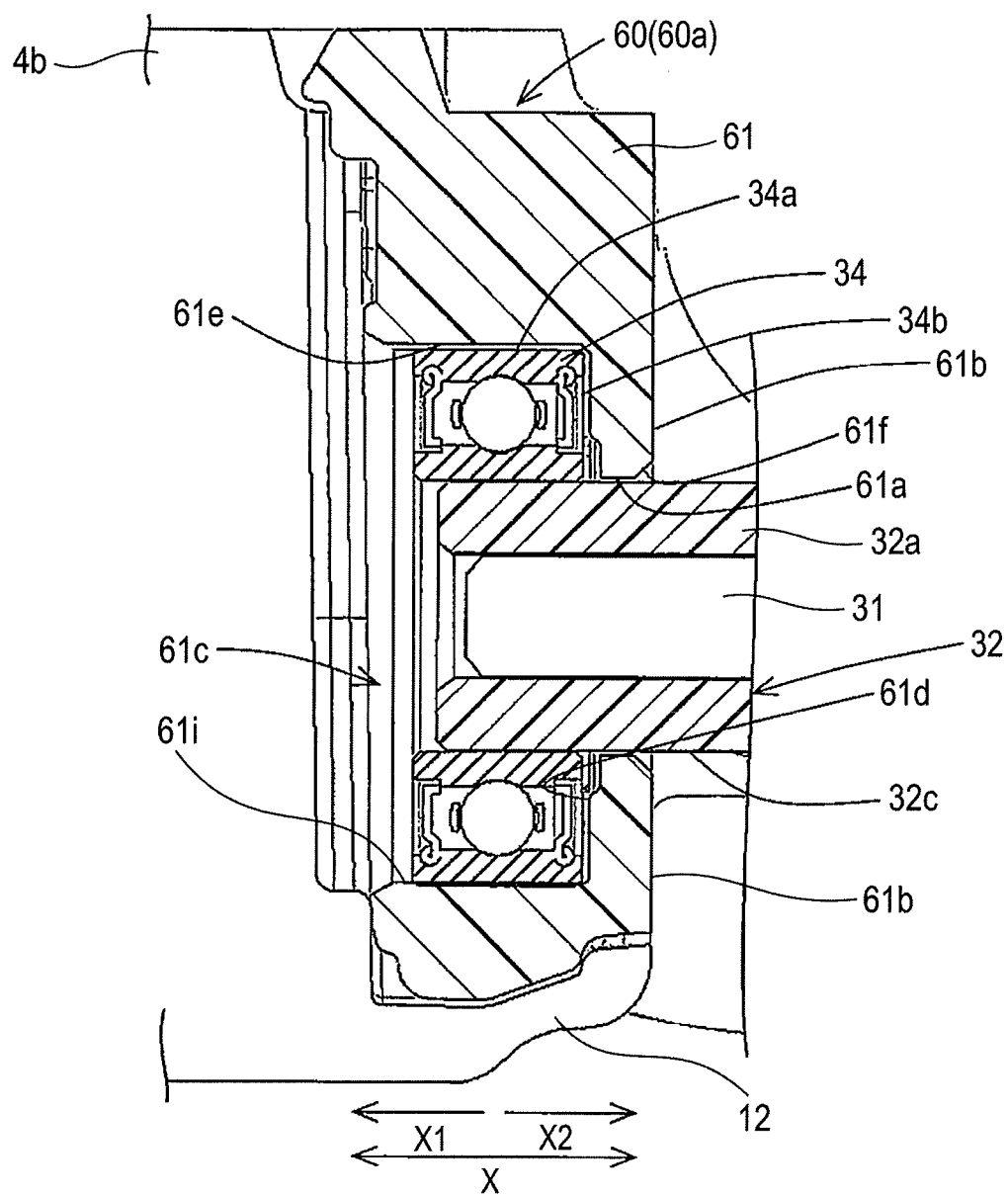
FIG. 5 is a sectional view taken V-V line in FIG. 4.

As illustrated in FIG. 5, the one end portion holding member 60a is mounted on the outer wall 12, and includes a hollow portion 61c of which one part is open, an insertion hole 61a into which the shaft insertion unit 32a of the valve body 32 is inserted and which communicates with the hollow portion 61c, and a wall surface 61b which is formed on the valve body 32 side, in a block-like holding unit main body 61. In addition, the ball bearing 34 is mounted on the hollow portion 61c of the holding unit main body 61. The holding unit main body 61 fixes the ball bearing 34 by forming an inner diameter portion 61i fitted to an outer diameter portion 34a of the ball bearing 34.

Figure 7:
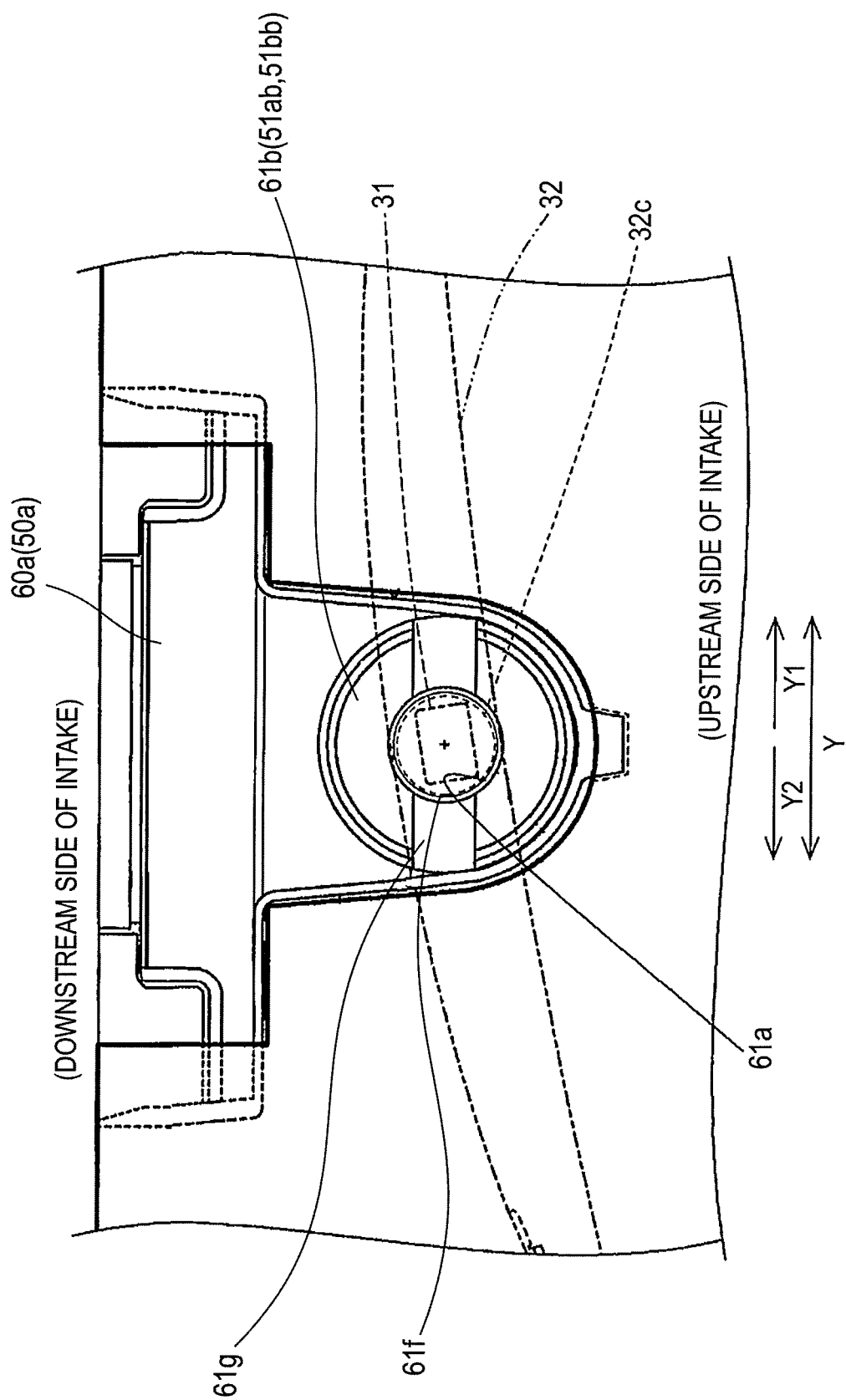
FIG. 7 is a partially enlarged view of a case where a state where a holding member is assembled is viewed in a rotation shaft direction, in the intake device of the disclosure.
Figure 8:
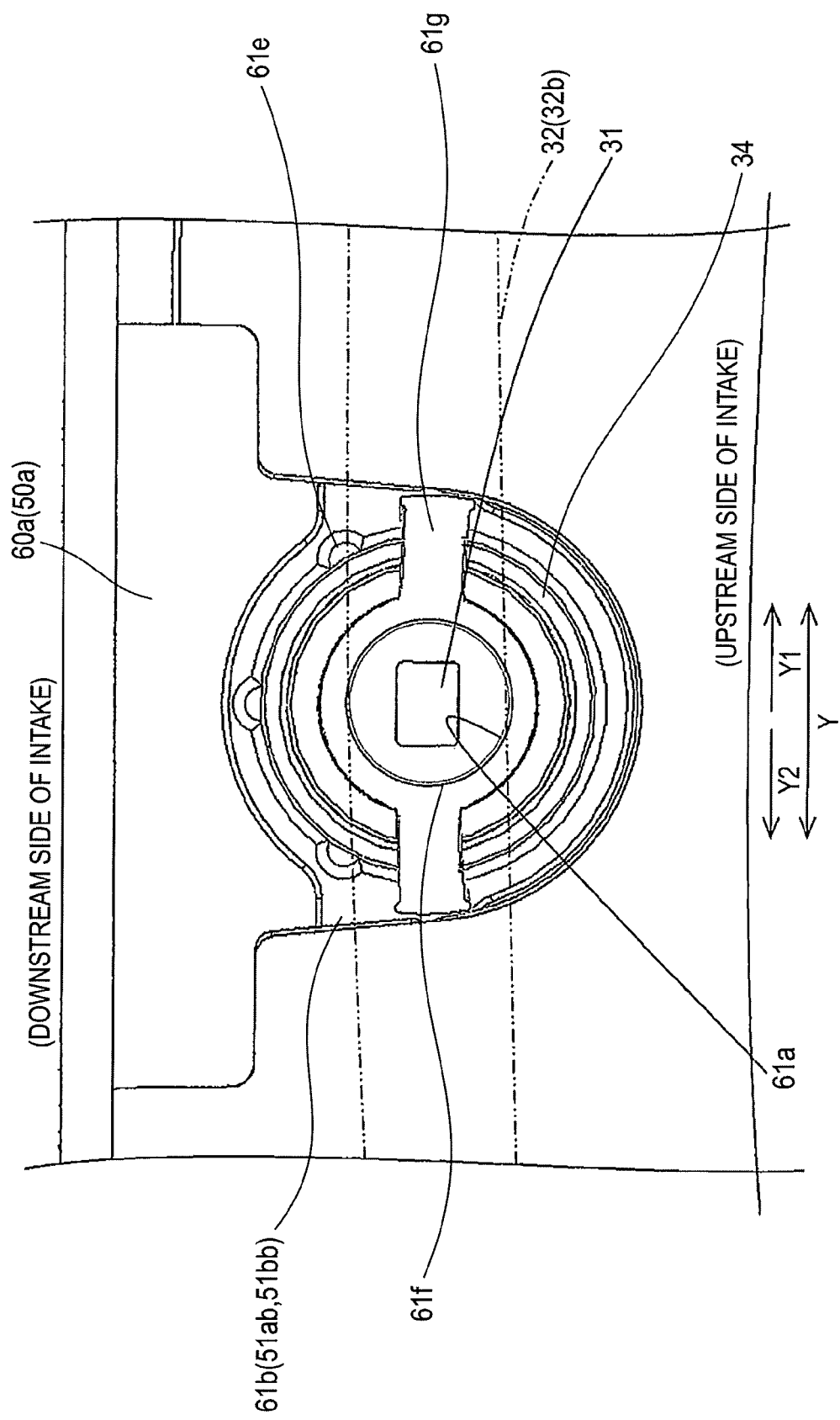
FIG. 8 is a partially enlarged view illustrating a modification example of the holding member in FIG. 7.

The ball bearing 34 supports the valve body 32 (shaft insertion unit 32a) to be freely rotatable. Here, since the valve body 32 is supported by the ball bearing 34, a slight void is formed between the insertion hole 61a and a shaft insertion unit outer diameter 32c of the shaft insertion unit 32a. In addition, the insertion hole 61a may be a circular hole as illustrated in FIG. 7 or 8.

In addition, the holding unit main body 61 forms a communication hole 61e at a part of the hollow portion 61c. The communication hole 61e is formed to communicate with the atmosphere and a void formed between a bottom surface 61d of the hollow portion 61c and an end surface 34b of the ball bearing 34. In addition, in the embodiment, an example in which one communication hole 61e is provided is illustrated, but in a state where the valve body 32 is closed, a plurality of communication holes 61e may be provided as long as the part is not a part that corresponds to a sealing line of the seal lip 32b.

Figure 4:
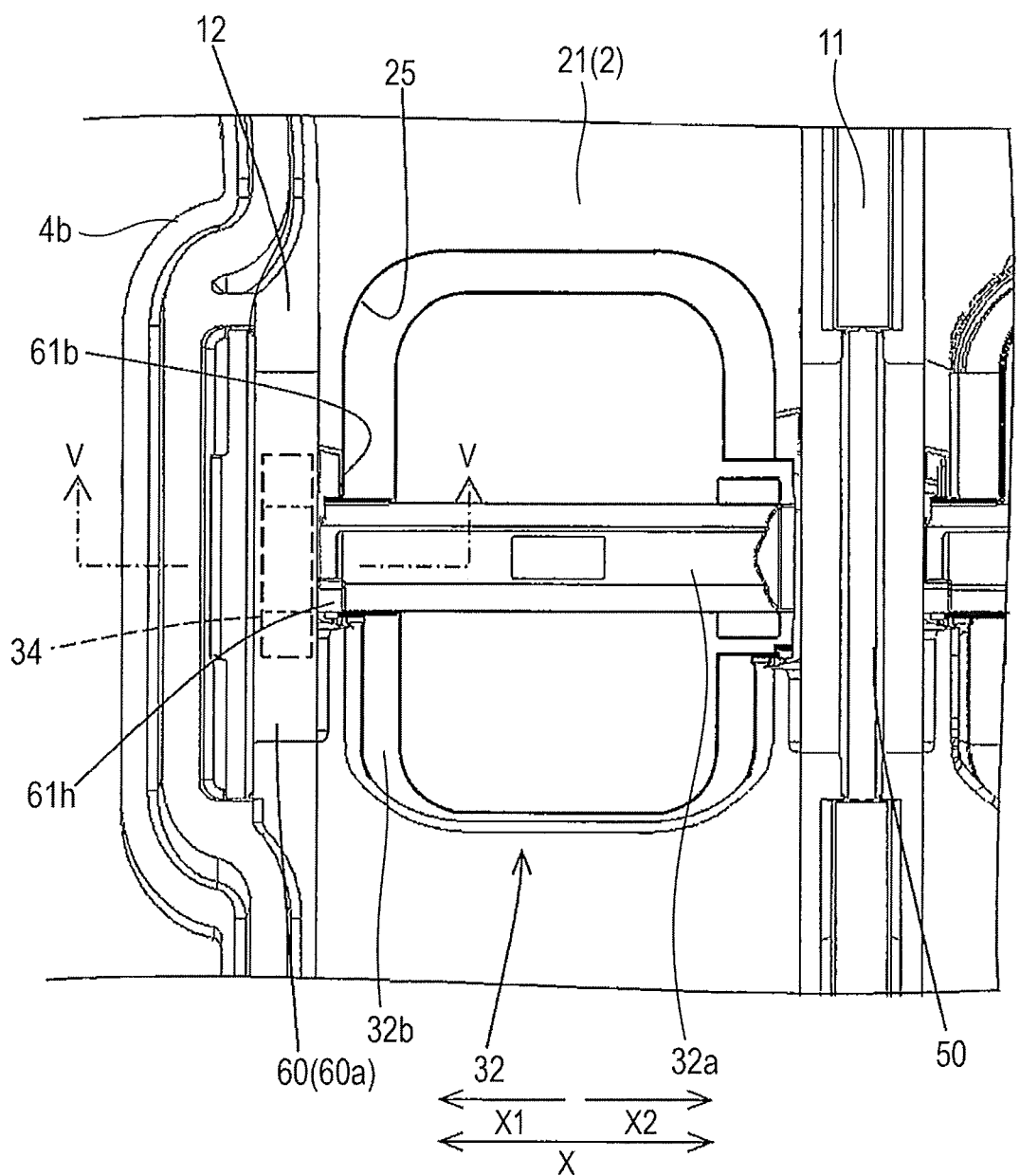
FIG. 4 is a partially enlarged view illustrating the valve body of a left end in FIG. 3.

In addition, as illustrated in FIG. 4, the holding unit main body 61 forms a projection portion 61h which protrudes to the valve body 32 side. At this time, the projection portion 61h is formed in a range which does not interfere with the rotation range of the valve body 32. In addition, the projection portion 61h may be provided on the wall surface 61b.

The wall surface 61b is configured to form substantially the same flat surface as the sealing surface 25 illustrated in FIGS. 1 and 4. Accordingly, the wall surface 61b is a counter surface which opposes and is close to the seal lip 32b of the valve body 32 similar to the sealing surface 25. At this time, the wall surface 61b and the seal lip 32b are formed such that a slight void is provided considering sealing properties, in order to reduce the torque that rotates the valve body 32.

In addition, in the wall surface 61b, in the direction in which the rotation shaft 31 extends, a slight void is formed between the bottom surface 61d of the hollow portion 61c and the end surface 34b of the ball bearing 34. The void may be a void in which the bottom surface 61d does not come into contact with the ball bearing 34 when the wall surface 61b is distorted as a load on the ball bearing 34 side is applied to the wall surface 61b in the direction in which the rotation shaft 31 extends.

In addition, the wall surface 61b forms a chamfering unit 61f at a mouth of the insertion hole 61a into which the rotation shaft 31 and the shaft insertion unit 32a of the valve body 32 are inserted. Here, the shape of the chamfering unit 61f may be a C-chamfered shape or an R-chamfered shape considering the cost or the shape of the inserted shaft insertion unit 32a of the valve body 32.

In addition, when the valve body 32 is in the closed state for improving the sealing properties, the wall surface 61b may be installed such that the wall surface 61b and the seal lip 32b abut against each other. In addition, as illustrated in FIG. 7 or 8, by forming a convex portion 61g which protrudes to the valve body 32 side on the wall surface 61b, when the valve body 32 is at a position which corresponds to a closed state, the seal lip 32b and the convex portion 61g may abut against each other.

The convex portion 61g is formed to abut against the seal lip 32b when the valve body 32 is inserted in a closed state.

In addition, as illustrated in FIGS. 5 and 7, the ball bearing 34 (not illustrated in FIG. 7) is in a state of being completely included in the holding unit main body 61, but when an abutting counter member of the seal lip 32b is also formed with respect to the part at which the ball bearing 34 is mounted when the valve body 32 is in a closed state, it is not necessary to completely include the ball bearing 34. In other words, as illustrated in FIG. 8, a part of the ball bearing 34 may be open to the valve body 32 side, the convex portion 61g may be formed only at a part which corresponds to the sealing range of the seal lip 32b. In a case of forming the convex portion 61g, the convex portion 61g and the sealing surface 25 form substantially the same flat surface, and the wall surface 61b is always formed at a position against which the seal lip 32b does not abut regardless the rotation of the valve body 32. In addition, the convex portion 61g may have a shape which is smoothly linked to the flat surface of the wall surface 61b.

Figure 6:
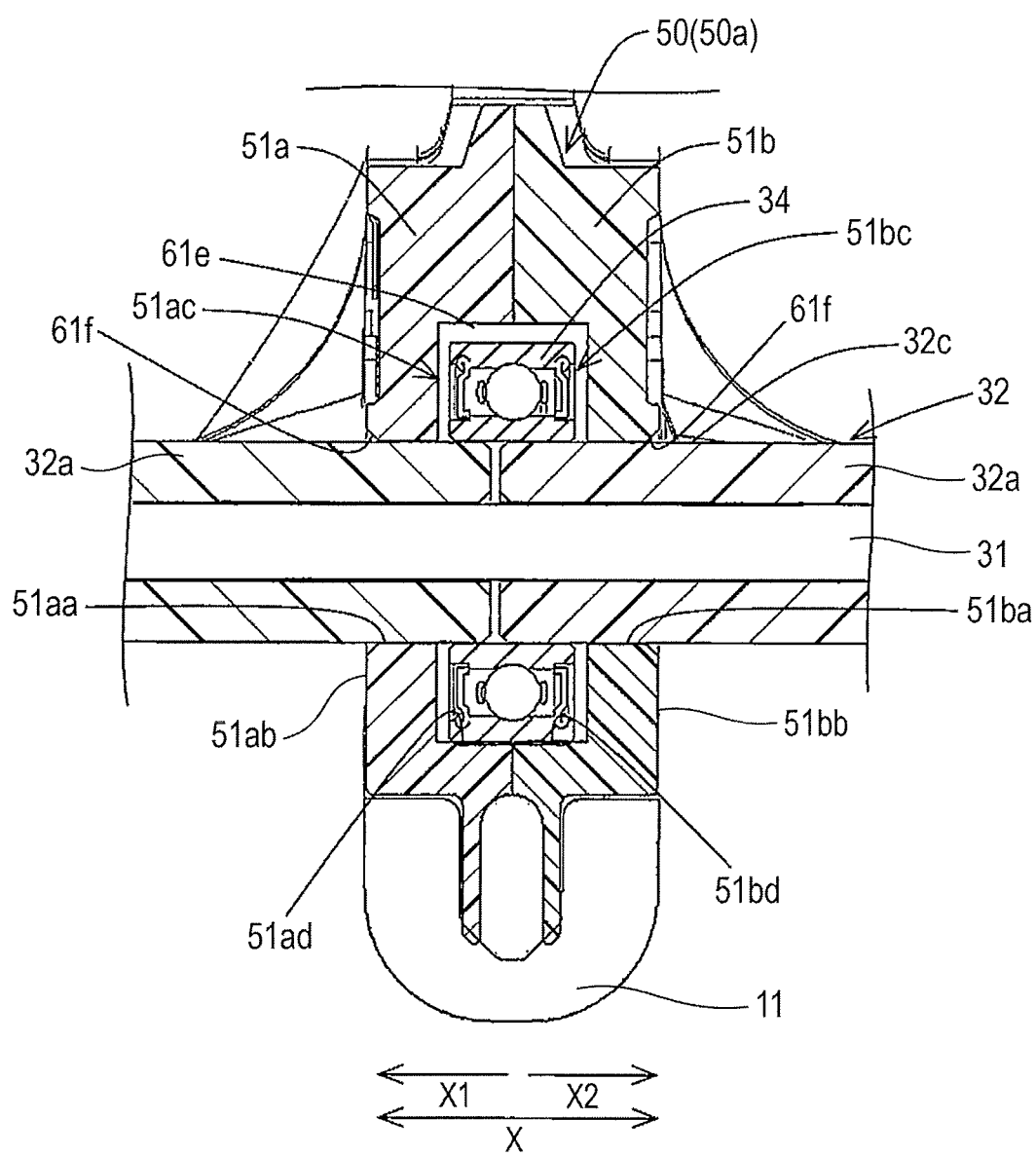
FIG. 6 is a sectional view taken VI-VI line in FIG. 3.

As illustrated in FIG. 6, the intermediate holding member 50a at the center includes a first holding unit main body 51a and a second holding unit main body 51b. Similar to the above-described holding unit main body 61, the first holding unit main body 51a and the second holding unit main body 51b respectively include hollow portions 51ac and 51bc of which one part is open, insertion holes 51aa and 51ba into which the shaft insertion unit 32a of the valve body 32 is inserted and which communicate with the hollow portions 51ac and 51bc, and wall surfaces 51ab and 51bb formed on the valve body 32 side, in a block-like member. In the embodiment, opening sides of the hollow portions 51ac and 51bc of each of the holding unit main bodies (the first holding unit main body 51a and the second holding unit main body 51b) are installed to oppose each other, and one hollow portion is configured to be formed. In addition, the ball bearing 34 is mounted on the hollow portions 51ac and 51bc. Here, in the hollow portions 51ac and 51bc, the ball bearing 34 is fixed by forming inner diameter portions 51ad and 51bd fitted to the outer diameter portion 34a of the ball bearing 34. In the embodiment, an example of fixing the outer diameter portion 34a by allowing each of the inner diameter portions 51ad and 51bd and the outer diameter portion 34a of the ball bearing 34 to be fitted to each other is illustrated, but in order to fix the ball bearing 34, only any one of the inner diameter portions 51ad and 51bd may be fitted. In other words, the inner diameter portion 51ad fitted to the outer diameter portion 34a of the ball bearing 34 and the wall surface 51ab may be formed in advance in the first holding unit main body 51a, and a lid (which corresponds to the wall surface 51bb) may be formed in the hollow portion 51ac in a state where the ball bearing 34 is mounted on the hollow portion 51ac. At this time, a relationship between the first holding unit main body 51a and the second holding unit main body 51b may be reversed.

The ball bearing 34 supports the valve body 32 (shaft insertion unit 32a) to be freely rotatable similar to the ball bearing 34 mounted on the above-described end portion holding member 60a. Here, in order to support the valve body 32 by the ball bearing 34, a slight void is formed between the insertion hole 51aa and the shaft insertion unit outer diameter 32c of the shaft insertion unit 32a.

Similar to the wall surface 61b formed in the end portion holding member 60, the wall surface 51ab is configured to form the same flat surface as the sealing surface 25 illustrated in FIGS. 1 and 4. Accordingly, the wall surface 51ab opposes the seal lip 32b of the valve body 32 similar to the sealing surface 25.

The first holding unit main body 51a and the second holding unit main body 51b are integrated being fitted to each other by a fitting unit which is not illustrated. Here, in the embodiment, an example in which the first holding unit main body 51a and the second holding unit main body 51b are integrated with each other by the fitting is illustrated, but the first holding unit main body 51a and the second holding unit main body 51b may be integrated with each other by welding or the like.

In addition, in the embodiment, an example in which the first holding unit main body 51a and the second holding unit main body 51b are formed to oppose each other by dividing the intermediate holding member 50 in the direction in which the rotation shaft 31 extends is illustrated, but the disclosure is not limited thereto. In other words, the first holding unit main body 51a and the second holding unit main body 51b may be formed in any manner as long as a configuration in which the ball bearing 34 is included in the intermediate holding member 50 is employed. Specifically speaking, when forming the intermediate holding member 50, the ball bearing 34 may be configured in the intermediate holding member 50 by insert-molding in a state where the ball bearing 34 is included. In addition, by dividing the first holding unit main body and the second holding unit main body considering a rotation shaft core of the rotation shaft 31 as the center in a perpendicular direction which is not illustrated, the ball bearing 34 may be included. In addition, when dividing the holding unit main bodies in the perpendicular direction, by forming the part which corresponds to a further lower side than the rotation shaft core of the rotation shaft 31 in advance at the main body part 4a, a part of the intermediate holding member 50 may be configured to be formed at the main body part 4a.

In addition, in the embodiment, as illustrated in FIG. 6, an example in which the first holding unit main body 51a and the second holding unit main body 51b have a shape which is horizontally symmetrical considering a joined surface as a reference is illustrated, but the disclosure is not limited thereto. Specifically speaking, similar to the above-described end portion holding member 60a, the shape of the wall surface 51ab formed in the first holding unit main body 51a and the wall surface 51bb formed in the second holding unit main body 51b may change as long as the shape has a function of sealing. As an example, the first holding unit main body 51a side may have a shape which completely includes the ball bearing 34 as illustrated in FIG. 7, and the second holding unit main body 51b side may have a shape in which a part of the ball bearing 34 is exposed as illustrated in FIG. 8.

In addition, similar to the above-described end portion holding member 60a, the convex portion 61g may be formed with respect to the wall surfaces 51ab and 51bb.

In addition, the above-described projection portion 61h illustrated in FIG. 4 may be formed in any one of the first holding unit main body 51a and the second holding unit main body 51b, and may be formed in any one of the wall surfaces 51ab and 51bb. In addition, a configuration which corresponds to the above-described convex portion 61g illustrated in FIGS. 7 and 8 may be formed in each of the wall surfaces 51ab and 51bb.

As illustrated in FIG. 1, when assembling the intake control valve 3 to the main body part 4a, in a state where the four valve bodies 32 and the intermediate holding member 50 are mounted on the rotation shaft 31, each of the intermediate holding members 50 is mounted on the bearing mounting unit 70 between the intake ports 2.

In a state where each of the intermediate holding members 50 is mounted on the bearing mounting unit 70, the first welding unit 13 of the partition wall 11 itself illustrated in FIG. 1 and an upper end surface of the intermediate holding member 50 which is not illustrated overlap each other, and a line of a series of welding ribs is configured on the partition wall 11 between the intake ports 2. In other words, on the partition wall 11 of the main body part 4a, regardless that the first welding unit 13 is formed at the part at which the bearing mounting unit 70 is formed (refer to FIG. 1), as each of the intermediate holding members 50 is mounted on the bearing mounting unit 70, a welding line made of the first welding units 13 and the upper end surfaces of each of the intermediate holding members 50 is configured.

Next, the main body part 4a on which the intermediate holding member 50 is mounted and the main body part 4b are joined by vibration welding. As a result, the upper end surfaces of each of the intermediate holding member 50 are welded to the second welding unit 14 of the main body part 4b together with the first welding unit 13 of the partition wall 11, and are fixed to the main body part 4b. Accordingly, in a state where the intermediate holding member 50 is mounted on the main body part 4a, the intermediate holding member 50 and the main body part 4a (upper surface of the partition wall 11) are welded to the main body part 4b.

In the embodiment, the following effects can be obtained.

In the embodiment, in a state where the intake control valve 3 is closed (illustrated in FIG. 2), the long port having a longer intake path length than those of the first port unit 21 and the outlet port unit 23 is formed (closed state). In the closed state, the effect as the long port deteriorates when the sealing properties of the intake control valve 3 deteriorate. Here, in the embodiment, as illustrated in FIG. 3, when the valve body 32 is in the closed state, even when mounting the ball bearing 34 on the intermediate holding members 50 and 60, as illustrated in FIG. 4, the sealing surface 25 formed in the first port unit 21 and the wall surfaces 51ab and 51bb, and 61b which are formed in the intermediate holding members 50 and 60 oppose the seal lip 32b formed in the valve body 32. Therefore, the void in a state where the valve is closed can be the minimum, and deterioration of sealing performance can be suppressed. Specifically speaking, even when mounting the ball bearing 34, it is possible to further reduce the opening for mounting the ball bearing 34 on the wall surfaces 51ab, 51bb, and 61b in the intermediate holding members 50 and 60, and to suppress deterioration of sealing properties for allowing the wall surfaces 51ab, 51bb, and 61b to further oppose the seal lip 32b of the valve body 32.

In addition, when the valve body 32 is in a closed state by forming the convex portion 61g in the wall surfaces 51ab, 51bb, and 61b, as the convex portion 61g and the seal lip 32b abut against each other, it is possible to further suppress deterioration of sealing properties. In addition, by providing a slight void (allowing the void to be close to and to oppose) between the wall surfaces 51ab, 51bb, and 61b and the seal lip 32b when the valve body 32 is in a state other than the closed state, when the valve is in an open state, it is possible to suppress generation of sliding resistance between the wall surfaces 51ab, 51bb, and 61b and the seal lip 32b. Accordingly, compared to a case where the convex portion 61g is provided in the entire circumference, it is possible to rotate the valve body 32 (rotation shaft 31) at a small torque of the actuator 33. In other words, it is possible to suppress deterioration of sealing properties even when mounting the ball bearing 34 after suppressing an increase in size of the actuator 33.

In addition, by forming the convex portion 61g, it is possible to provide a slight void between the wall surfaces 51ab, 51bb, and 61b and the seal lip 32b, and thus, for example, even when foreign materials or the like flow into the part at which the wall surfaces 51ab, 51bb, and 61b are positioned, it is possible to prevent the foreign materials from entering the position at which the ball bearing 34 is mounted by the convex portion 61g. Accordingly, even when mounting the ball bearing 34, it is possible to maintain a bearing function for a long period of time.

In addition, it is possible to achieve improvement of durability by mounting the ball bearing 34 against the wear of the intermediate holding members 50 and 60 caused by the rotation of the rotation shaft 31. Accordingly, since it is possible to achieve reduction of wear compared to a case where the intermediate holding members 50 and 60 are plain bearings, it is possible to suppress air leakage (deterioration of sealing properties) from the wear location.

In addition, in the direction in which the rotation shaft 31 extends, by forming the void between the wall surfaces 51ab, 51bb, and 61b and the ball bearing 34, for example, it is possible to configure that an assembly load generated when assembling the rotation shaft 31 is applied only to the wall surfaces 51ab, 51bb, and 61b. Accordingly, since the assembly load does not act on the ball bearing 34, when assembling the rotation shaft 31, the ball bearing 34 is not damaged.

In addition, on the wall surfaces 51ab, 51bb, and 61b, the chamfering unit 61f is formed at the mouth into which the valve body 32 is inserted, and thus, assembly properties of the valve body 32 are improved. Accordingly, since the shaft insertion unit 32a of the valve body 32 is inserted in a state of being guided by the wall surfaces 51ab, 51bb, and 61b, assembly properties are also improved with respect to the ball bearing 34. In other words, it is possible to improve assembly properties even in a case of configuring the ball bearing 34 while suppressing deterioration of sealing properties, by the wall surfaces 51ab, 51bb, and 61b.

As illustrated in FIG. 5, by forming the communication hole 61e which communicates with the atmosphere at a part of the hollow portion 61c, it is possible to hold the pressure at the part at which the ball bearing 34 is mounted to be in a state of being as close as possible to that of the atmosphere. Accordingly, there is a concern that the pressure acts on the ball bearing 34 via the insertion hole 61a considering various pressure situations, such as a case where the pressure generated in the intake port 2 is relatively high or a case where the pressure is relatively low. Here, as the pressure at the part at which the ball bearing 34 is mounted becomes close to that of the atmosphere state, for example, flying of grease or the like with which the inside of the ball bearing 34 is coated is suppressed. Accordingly, it is possible to maintain a function as a bearing of the ball bearing 34 for a long period of time.

In addition, it is possible to set a reference point which confirms the open and closed state of the valve body 32 by forming the projection portion 61h. When the valve body 32 is in a closed state or in an open state, the valve body 32 abuts against the projection portion 61h by forming an abutting unit (not illustrated) which corresponds to the projection portion 61h with respect to the valve body 32, and it is possible to confirm that the valve is in the closed state or in the open state.

In addition, in the above-described embodiment, an example in which the wall surfaces 51ab, 51bb, and 61b are configured in the intermediate holding members 50 and 60 is illustrated, but the disclosure is not limited thereto. In other words, an abutting surface (the same function as the sealing of the wall surface) against which the seal lip 32b abuts when the valve body 32 is in a closed state may be formed, for example, at the main body parts 4a and 4b (not illustrated).

In addition, in the above-described embodiment, an example in which the intake device 100 provided with the intermediate holding members 50 and 60 of the disclosure is employed in an in-line four-cylinder engine for a vehicle is illustrated, but the disclosure is not limited thereto. The intake device 100 provided with the intermediate holding members 50 and 60 of the disclosure may be employed in an airflow control valve structure, such as an internal combustion engine other than the engine for a vehicle (for example, a gas engine (internal combustion engine, such as a diesel engine and a gas engine) other than a gasoline engine). In addition, the disclosure may be employed in an airflow control valve structure, such as a V-type cylinder engine or a horizontal opposing type engine other than the in-line four-cylinder engine, regardless whether or not the engine is a gasoline engine. In addition, the disclosure may be employed not only in a vehicle but also in an airflow control valve structure of an internal combustion engine which is installed as a driving source (power source) of equipment.

A feature of an intake device of an internal combustion engine according to an aspect of this disclosure resides in that the intake device of an internal combustion engine includes: a plurality of intake ports which have outer walls and partition walls and are adjacent to each other via the partition walls; a valve body which is provided in each of the intake ports, and switches a flow path of the intake port by rotation around a rotation shaft; a holding member which is installed on each of the outer walls and the partition walls; and a rolling bearing which is mounted on at least one of the holding members, and supports the valve body to be freely rotatable, in which the holding member includes a wall surface between the rolling bearing and the valve body in a direction in which the rotation shaft extends.

According to this configuration, by forming the wall surface even when mounting the rolling bearing on the holding member, it is possible to embed a void between the rolling bearing and the valve body. Accordingly, when switching the flow path, it is possible to suppress leakage of fluid from the part at which the rolling bearing of the holding member is mounted. Accordingly, it is possible to suppress deterioration of sealing performance even when mounting the rolling bearing.

Another feature of the aspect of this disclosure resides in that the wall surface opposes and being close to at least a part of a sealing unit formed around the valve body.

According to this configuration, since the sealing unit of the valve body and the wall surface are installed to oppose each other, it is possible to further embed the void between the rolling bearing and the valve body. Accordingly, it is possible to suppress deterioration of sealing performance even when mounting the rolling bearing.

Another feature of the aspect of this disclosure resides in that the holding member installed on the partition wall includes a first member and a second member, and the rolling bearing may be mounted between the first member and the second member in the direction in which the rotation shaft extends.

According to this configuration, in the plurality of installed holding members, it is possible to provide the wall surface even when mounting the rolling bearing in any holding member, and thus, it is possible to suppress deterioration of sealing performance even when mounting the rolling bearing.

Another feature of the aspect of this disclosure resides in that the wall surface abuts against the sealing unit in a state where the valve is closed when the sealing unit abuts against a sealing surface formed in the intake port.

According to this configuration, the sealing unit of the valve body and the wall surface can abut against each other when the valve body is in a closed state. In other words, it is possible to form the wall surface which abuts against the sealing unit with respect to the part at which the rolling bearing is mounted. Accordingly, it is possible to suppress deterioration of sealing performance even when mounting the rolling bearing.

Another feature of the aspect of this disclosure resides in that the wall surface has a convex portion which protrudes toward the valve body, and the convex portion and the sealing unit may abut against each other.

According to this configuration, when the valve body is in a closed state, the convex portion is formed on the wall surface, and thus, it is also possible to further hold the sealed state. Accordingly, it is possible to suppress deterioration of sealing performance even when mounting the rolling bearing.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An intake device of an internal combustion engine, comprising:
    a plurality of intake ports which have outer walls and partition walls and are adjacent to each other via the partition walls;
    a valve body which is provided in each of the intake ports, and switches a flow path of the intake port by rotation around a rotation shaft;
    a holding member which is installed on each of the outer walls and the partition walls; and
    a rolling bearing which is mounted on at least one of the holding members, and supports the valve body to be freely rotatable,
    wherein the holding member includes a wall surface between the rolling bearing and the valve body in a direction in which the rotation shaft extends, the wall surface of the holding member being positioned towards the valve body, relative to a surface of the rolling bearing facing the valve body, in the direction in which the rotation shaft extends.

2. The intake device of an internal combustion engine according to claim 1,
    wherein the wall surface opposes and being close to at least a part of a sealing unit formed around the valve body.

3. The intake device of an internal combustion engine according to claim 1,
    wherein the holding member installed on the partition wall includes a first member and a second member, and
    wherein the rolling bearing is mounted between the first member and the second member in the direction in which the rotation shaft extends.

4. The intake device of an internal combustion engine according to claim 2,
    wherein the holding member installed on the partition wall includes a first member and a second member, and
    wherein the rolling bearing is mounted between the first member and the second member in the direction in which the rotation shaft extends.

5. The intake device of an internal combustion engine according to claim 2,
    wherein the wall surface abuts against the sealing unit in a state where the valve body is closed when the sealing unit abuts against a sealing surface formed in the intake port.

6. The intake device of an internal combustion engine according to claim 3,
    wherein the wall surface abuts against the sealing unit in a state where the valve body is closed when the sealing unit abuts against a sealing surface formed in the intake port.

7. The intake device of an internal combustion engine according to claim 4,
    wherein the wall surface abuts against the sealing unit in a state where the valve body is closed when the sealing unit abuts against a sealing surface formed in the intake port.

8. The intake device of an internal combustion engine according to claim 7,
    wherein the wall surface has a convex portion which protrudes toward the valve body, and the convex portion and the sealing unit abut against each other.

9. The intake device of an internal combustion engine according to claim 1, wherein a void is formed between the wall surface of the holding member and the rolling bearing in the direction in which the rotation shaft extends.

10. The intake device of an internal combustion engine according to claim 9, wherein the holding member includes a hollow portion at which the rolling bearing is mounted, and a communication hole is formed at the hollow portion relative to the rolling bearing to communicate between atmosphere and the void formed between the wall surface of the holding member and the rolling bearing in the direction in which the rotation shaft extends.

* * * * *